US011180079B2

(12) United States Patent
Marc et al.

(10) Patent No.: US 11,180,079 B2
(45) Date of Patent: Nov. 23, 2021

(54) STEERING WHEEL ASSEMBLY WITH COVERED LIGHT SOURCE

(71) Applicant: Joyson Safety Systems Acquisition LLC, Auburn Hills, MI (US)

(72) Inventors: Adorian Marc, Troy, MI (US); Makoto Kawaguchi, Troy, MI (US); Erick Staszak, Clarkston, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/144,052

(22) Filed: Jan. 7, 2021

(65) Prior Publication Data

US 2021/0206317 A1    Jul. 8, 2021

Related U.S. Application Data

(60) Provisional application No. 62/958,283, filed on Jan. 7, 2020.

(51) Int. Cl.
| | |
|---|---|
| *F21V 21/00* | (2006.01) |
| *B60Q 3/283* | (2017.01) |
| *B60Q 3/64* | (2017.01) |
| *B62D 1/06* | (2006.01) |
| *B62D 1/04* | (2006.01) |

(52) U.S. Cl.
CPC ............... *B60Q 3/283* (2017.02); *B60Q 3/64* (2017.02); *B62D 1/04* (2013.01); *B62D 1/06* (2013.01); *B62D 1/065* (2013.01)

(58) Field of Classification Search
CPC . B60Q 3/283; B60Q 3/64; B60Q 3/62; B60Q 3/66; B62D 1/06; B62D 1/04; B62D 1/065

USPC .................................................. 362/488, 511
See application file for complete search history.

(56) References Cited

U.S. PATENT DOCUMENTS

| | | | |
|---|---|---|---|
| 6,296,380 B1 * | 10/2001 | Dawli | B60Q 3/283 362/224 |
| 7,934,439 B2 | 5/2011 | Bostick | |
| 8,136,425 B2 | 3/2012 | Bostick | |
| 8,296,012 B2 | 10/2012 | Cech et al. | |
| 9,233,638 B2 | 1/2016 | Lisseman et al. | |
| 9,308,856 B2 * | 4/2016 | Lisseman | B60Q 3/283 |
| 9,308,857 B2 | 4/2016 | Lisseman et al. | |
| 9,481,297 B2 * | 11/2016 | Salter | B62D 15/029 |
| 9,520,061 B2 | 12/2016 | Cech et al. | |
| 9,580,012 B2 | 2/2017 | Lisseman et al. | |
| D806,729 S | 1/2018 | Lisseman et al. | |

(Continued)

*Primary Examiner* — Laura K Tso
(74) *Attorney, Agent, or Firm* — Meunier Carlin & Curfman LLC

(57) ABSTRACT

An illumination system for a steering wheel assembly of a vehicle including a housing coupled to a rim of the steering wheel assembly. At least one visible light source is disposed adjacent the housing and emitting visible light through an opening in the housing. A lens is provided covering the opening in the housing such that an inner surface of the lens is disposed adjacent the opening in the housing. A cover material covers the outer surface of the lens and at least a portion of the rim, and includes translucent and/or transparent portions such that the lens is not visible through the cover material. The visible light from the visible light source passes through the transparent and/or translucent portions of the cover material.

21 Claims, 10 Drawing Sheets

(56) References Cited

U.S. PATENT DOCUMENTS

| | | | |
|---|---|---|---|
| 9,873,446 B2* | 1/2018 | Gardner | B60Q 9/00 |
| 10,011,222 B1* | 7/2018 | Wu | F21S 9/04 |
| D847,190 S | 4/2019 | Lisseman et al. | |
| 10,793,063 B1* | 10/2020 | Samuel, Jr. | B60Q 3/80 |
| 2001/0010179 A1* | 8/2001 | Ku | B62D 1/06 |
| | | | 74/558 |
| 2007/0153535 A1* | 7/2007 | Bostick | B60Q 3/283 |
| | | | 362/488 |
| 2008/0202282 A1* | 8/2008 | Bassett | B62D 1/06 |
| | | | 74/552 |
| 2010/0107806 A1* | 5/2010 | Corinaldi | B62D 1/046 |
| | | | 74/552 |
| 2014/0301097 A1 | 10/2014 | Neumann et al. | |
| 2015/0123947 A1* | 5/2015 | Jubner | B60K 37/06 |
| | | | 345/175 |
| 2016/0025281 A1 | 1/2016 | Gardner et al. | |
| 2016/0200246 A1 | 7/2016 | Lisseman et al. | |
| 2016/0200343 A1 | 7/2016 | Lisseman et al. | |
| 2016/0311366 A1 | 10/2016 | Lisseman | |
| 2018/0208111 A1 | 7/2018 | Lisseman et al. | |
| 2020/0001782 A1* | 1/2020 | Kamei | B60Q 3/64 |

* cited by examiner

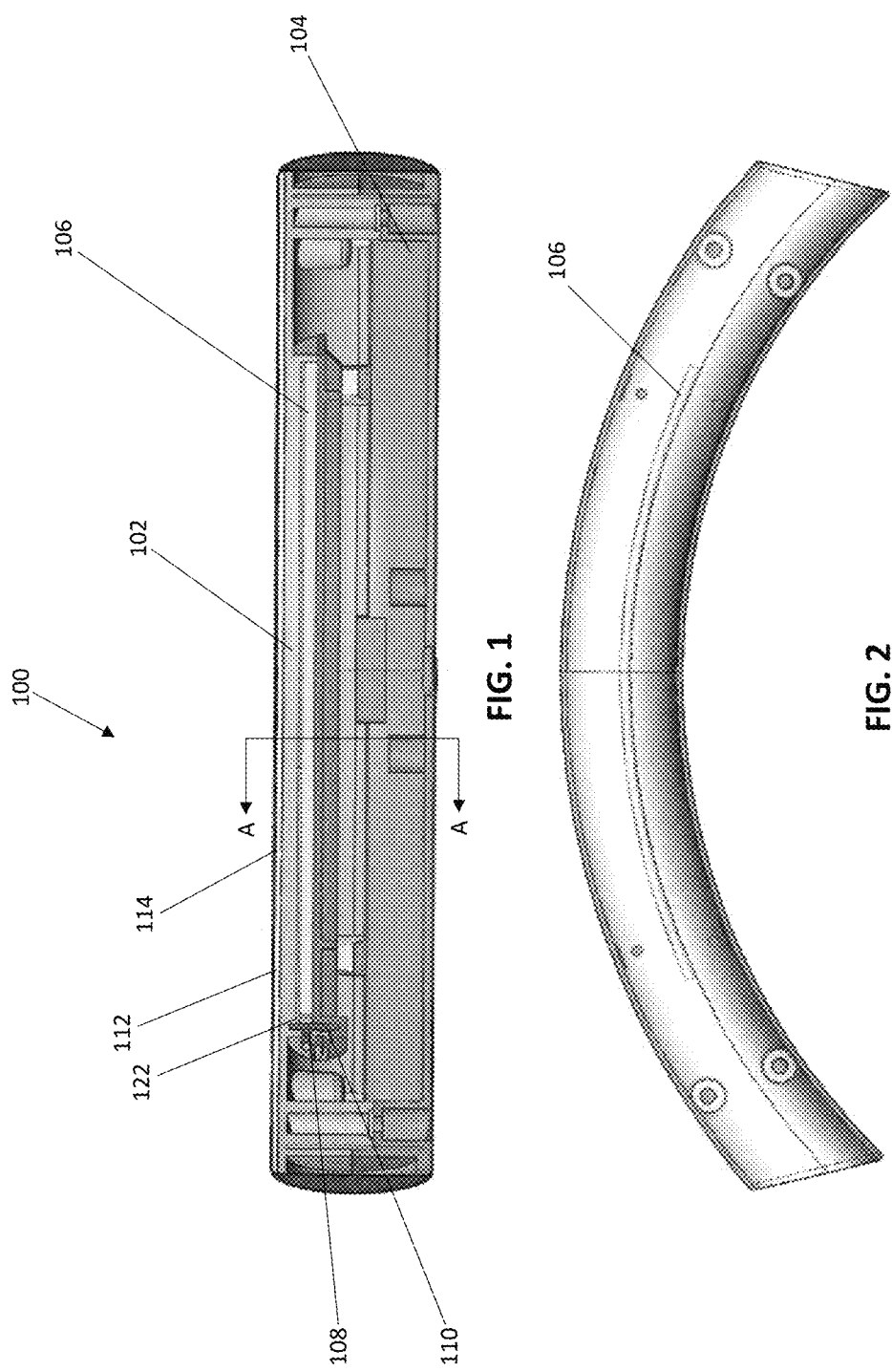

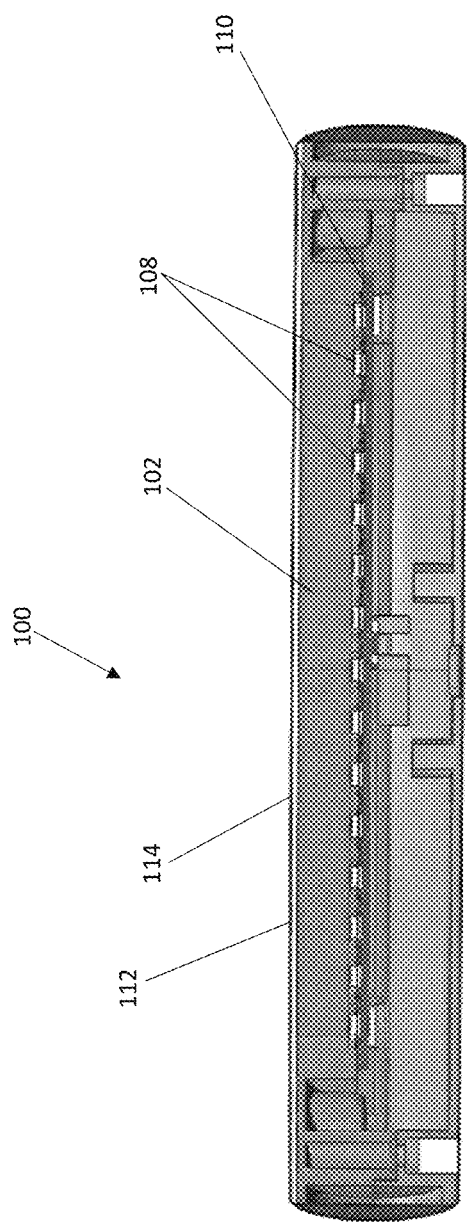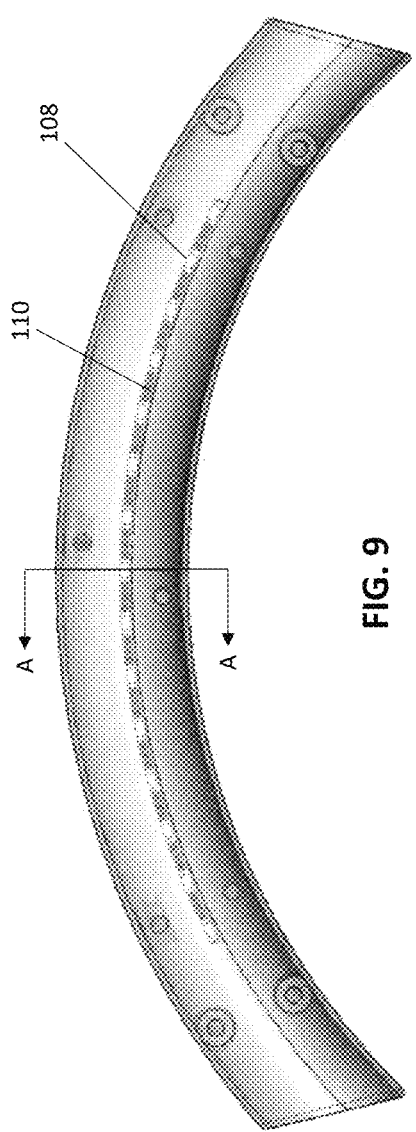
FIG. 8
FIG. 9

STEERING WHEEL ASSEMBLY WITH COVERED LIGHT SOURCE

CROSS REFERENCE TO RELATED APPLICATIONS

This application claims priority to and incorporates entirely by reference U.S. Provisional Patent Application Ser. No. 62/958,283 filed on Jan. 7, 2020 and entitled "LIGHT THROUGH LEATHER LIGHTBAR."

BACKGROUND

Conventional steering wheel lightbars are assembled by installing a housing, printed circuit board assembly (PCBA), thermal pad, diffuser film, brightness enhancement films, wire harness, and/or light guide onto a foamed armature/rim of the steering wheel assembly. The foamed armature is then wrapped in leather and/or other materials. Finally, a translucent lens is assembled to the leather wrapped foamed armature completing the lightbar assembly. Due to the difference in lens and leather material, the location and presence of the light guide is easily identifiable.

BRIEF SUMMARY

The present disclosure is directed to an illumination system for a steering wheel assembly of a vehicle. Various implementations include a housing coupled to a rim of the steering wheel assembly and at least one visible light source is disposed adjacent the housing. The visible light source emitting visible light through an opening in the housing and towards the vehicle occupant. A lens covers the opening in the housing such that an inner surface of the lens is disposed adjacent the opening in the housing. A cover material is provided that covers an outer surface of the lens and at least a portion of the rim, the cover material including translucent and/or transparent portions, wherein the lens is not visible through the cover material. Visible light from the visible light source passes through the transparent and/or translucent portions of the cover material.

In some implementations, the cover material includes opaque portions.

In some implementations, the cover material includes at least one of a translucent leather material, a translucent artificial leather material, and a translucent fabric material.

In some implementations, the translucent and/or transparent portions of the cover material are not visible until the visible light source is illuminated.

In some implementations, the visible light source, the housing, and/or the lens is not visible through the cover material.

In some implementations, any seam between an edge of the lens and the rim of the steering wheel assembly is not visible through the cover material.

In some implementations, the illumination system further includes a light guide received within the housing, where the at least one light source disposed adjacent the light guide. The light source is disposed adjacent at least one of a first end and a second end of the light guide, the light source emitting visible light into at least one of the first and second ends of the light guide through the light guide and out an outer surface of the light guide. The inner surface of the lens is disposed facing the outer surface of the light guide such at least some of the light emitted from the outer surface of the light guide is directed toward the lens.

In some implementations, the light guide and the housing have a corresponding arcuate shape, the arcuate shape of the housing and light guide corresponding to an arcuate shaped portion of the rim.

In some implementations, the visible light source is thermally coupled to a frame of the steering assembly such that the frame transfers heat from the visible light source toward the frame.

In some implementations, the lens is translucent.

In some implementations, at least a portion of the lens is opaque.

In some implementations, one or more light directing films are disposed in a path of the light emitted from the light source.

In some implementations, one or more light diffusing films and/or light enhancing films are disposed in a path of the light emitted from the visible light source.

In some implementations, at least one masking layer is coupled to the lens, the masking layer at least partially blocking and/or shaping a boundary of the light emitted from the visible light source and/or light guide when used.

In some implementations, a second housing is coupled to the housing, the second housing positioned around a circumference of the rim of the steering wheel assembly from the housing.

In some implementations, a plurality of housings are coupled to a front surface of the rim, wherein opposing ends of each of the plurality of housings are coupled to an adjacent housing such that the plurality of housings fully encircle a circumference of the rim.

In some implementations, the opposing ends of the plurality of housings are bonded together using at least one of a mechanical and a chemical fastener.

In some implementations, the bonded opposing ends of the plurality of housings are sanded after being bonded together to prevent appearance of a seam being visible through the cover material.

In some implementations, the housing and the light guide (when used) have a corresponding arcuate shape, the arcuate shape of the housing and light guide (when used) corresponding to an arcuate shaped portion of the rim.

In some implementations, the visible light source includes a plurality of individually controlled light sources positioned around at least a portion of a circumference of the rim of the steering wheel.

Various implementations of an illumination system for a steering wheel assembly of a vehicle comprise a housing coupled to a rim of the steering wheel assembly and a light guide received within the housing. A visible light source is disposed adjacent the housing and emitting visible light through an opening in the housing, the visible light source is provided adjacent an end surface of the light guide and emits visible light through the light guide and out the outer surface of the light guide. A lens is provided covering the light guide such that an inner surface of the lens is disposed facing an outer surface of the light guide. A cover material is provided covering an outer surface of the lens and at least a portion of the rim, wherein the cover material includes translucent and/or transparent portions. The light guide transmits visible light from the visible light source through at least a portion of the outer surface of the light guide, and the light from the outer surface of the light guide passes through the lens and the transparent and/or translucent portions of the cover material. The translucent and/or transparent portions of the cover material are not visible until the visible light source is illuminated.

In some implementations, the light source is an LED.

In some implementations, the light source includes a plurality of LEDs positioned around the circumference of the rim of the steering wheel.

BRIEF DESCRIPTION OF THE DRAWINGS

Example features and implementations are disclosed in the accompanying drawings. However, the present disclosure is not limited to the precise arrangements and instrumentalities shown. Similar elements in different implementations are designated using the same reference numerals.

FIG. 1 is a top partial cross section view of an example illumination system and steering wheel rim.

FIG. 2 is a partial front view of the illumination system and steering wheel rim of FIG. 1.

FIG. 8 a top partial cross section view of an example illumination system and steering wheel rim.

FIG. 9 is a partial front view of the illumination system and steering wheel rim of FIG. 8.

DETAILED DESCRIPTION

Figure 3:
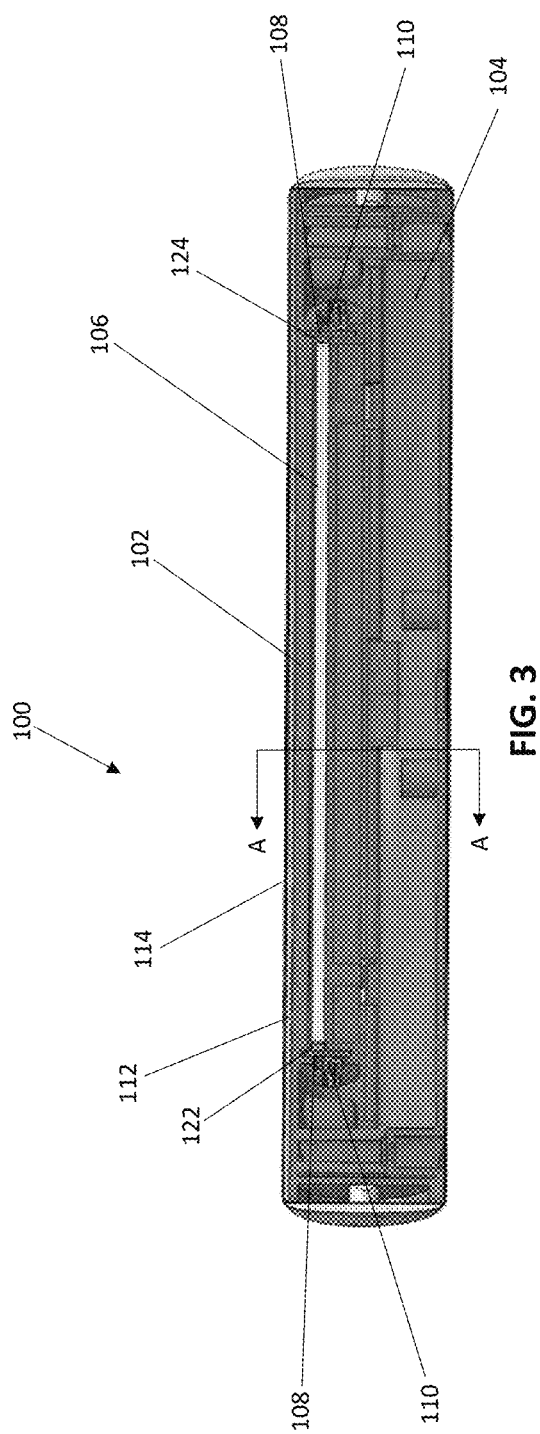
FIG. 3 is a top partial cross section view of an example illumination system and steering wheel rim.
Figure 4:
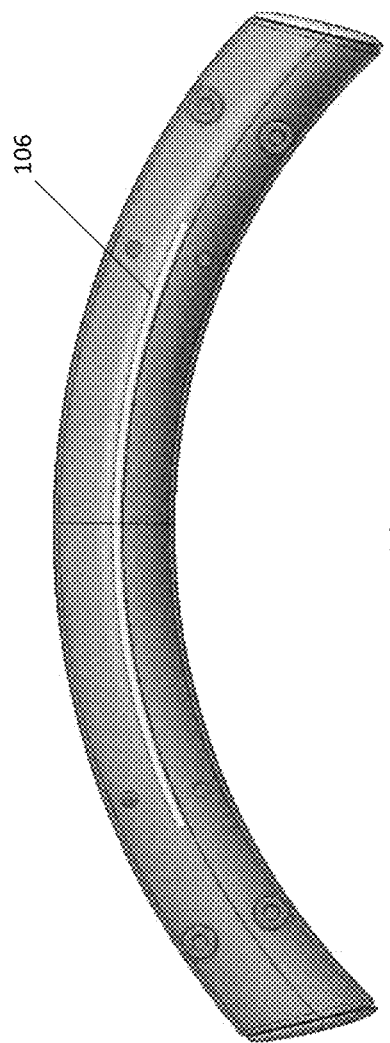
FIG. 4 is a partial front view of the illumination system and steering wheel rim of FIG. 3.
Figure 5:
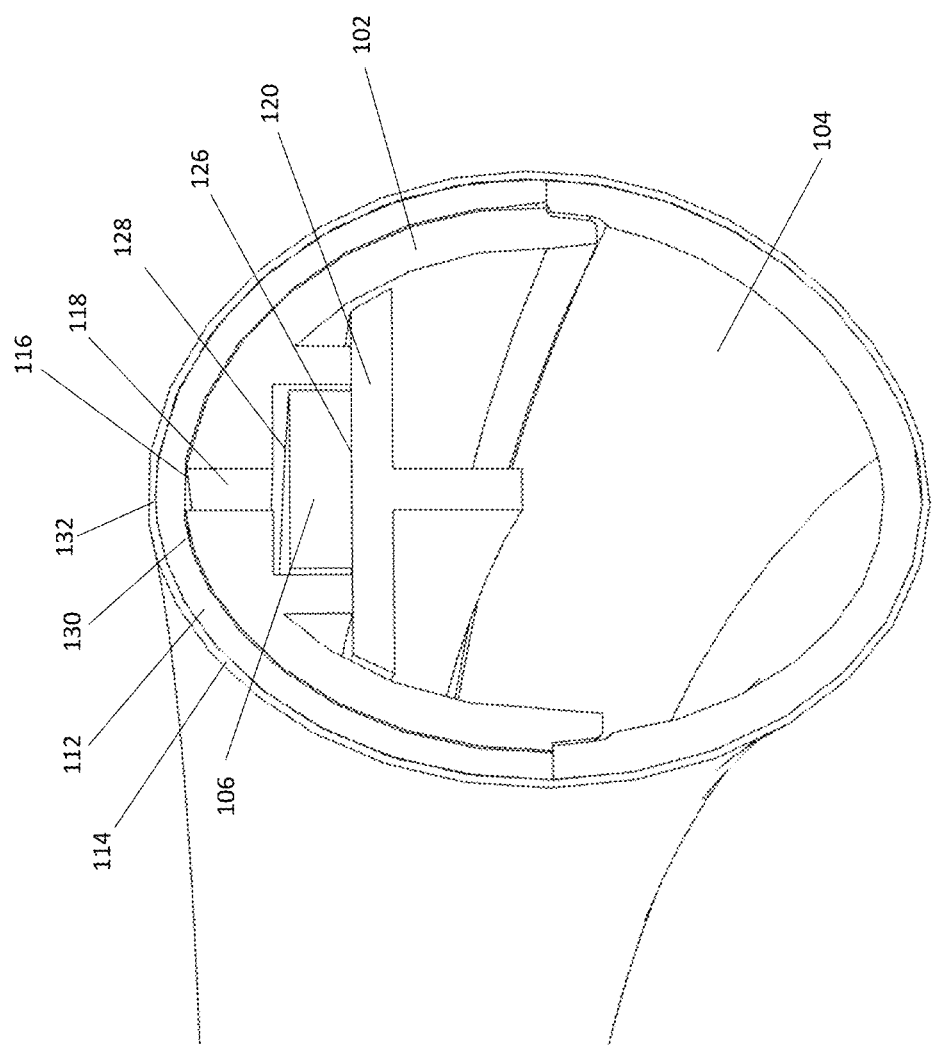
FIG. 5 is a cross section view of the illumination system and steering wheel rim of FIG. 1 and/or FIG. 3 along section lines A-A.

An object of the present disclosure is to provide a steering wheel assembly including an illuminated lightbar for display to vehicle occupant(s). As described here, the steering wheel includes a covering material that conceals the location and presence of a light source and/or lightbar. FIGS. 1 and 3 provide a top partial cross section view of an example illumination system 100 provided on a steering wheel rim. FIGS. 2 and 4 provide corresponding partial front views of each of the illumination systems. FIG. 5 provides a cross section view of the illumination system 100 and steering wheel rim of FIGS. 1-4 along section lines A-A. The illumination system 100 includes a housing 102 coupled to the rim 104/armature of the steering wheel. A light guide 106 is received within a housing 102. For example, as illustrated in FIG. 5, the light guide 106 is mounted on a base 120 portion of the housing 102. The base 120 can be formed with the housing 102 and our separately formed and coupled to the housing 102. As provided in FIG. 5, the inner surface 126 of the light guide 106 is positioned adjacent the base 120 and the outer surface 128 is positioned facing the front surface (e.g., passenger facing surface) of the steering wheel assembly. A light source 108 can be disposed adjacent the light guide 106 such that the light source 108 emits light into the light guide 106. The light is then directed through the outer surface 128 of the light guide 106 and toward the front surface (e.g., passenger facing surface) of the steering wheel assembly. As illustrated in FIG. 5, the light is directed through a light channel 118 towards an opening 116 in the housing 102. The light then passes through the lens 112 (from the inner surface 130 of the lens 112 to the outer surface 132 of the lens 112) and cover material 114 towards the vehicle occupant. As described in more detail below, the light channel 118 has straight opposing side walls for directing light from the light source 108 to the opening 116. As provided in FIG. 5, the opposing sides/walls of the light channel 118 are symmetrically shaped and similarly angled between the light source 108 and the opening 116.

In an example embodiment, the light source 108 includes at least one LED. The LED can be coupled to a PCB 110 for controlling its operation. The light source 108 can be thermally coupled to the rim 104 of the steering wheel assembly. For example, a heat dissipating material can be provided between the light source 108 and the rim 104 for transferring heat from the light source 108 to the rim 104. Example steering wheel assemblies including a heat dissipating material thermally coupled to a light element provided on the steering wheel rim are described in U.S. Patent Publication No. US 2014/0301097, which is herein incorporated by reference in its entirety. The light guide 106 and light source 108 can have a corresponding arcuate shape as the housing 102 with respect to the corresponding arcuate shape/curvature of the front surface (passenger facing surface) of the steering wheel assembly.

Figure 10:
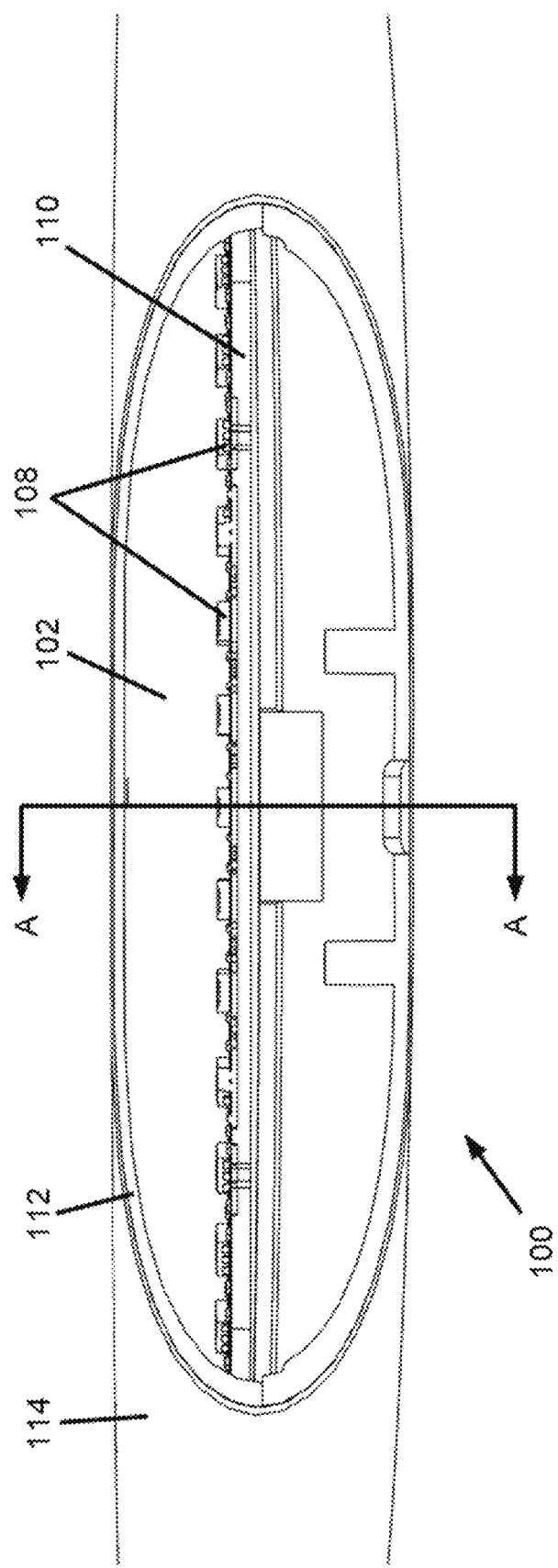
FIG. 10 a top partial cross section view of the illumination system and steering wheel rim of FIG. 8.
Figure 11:
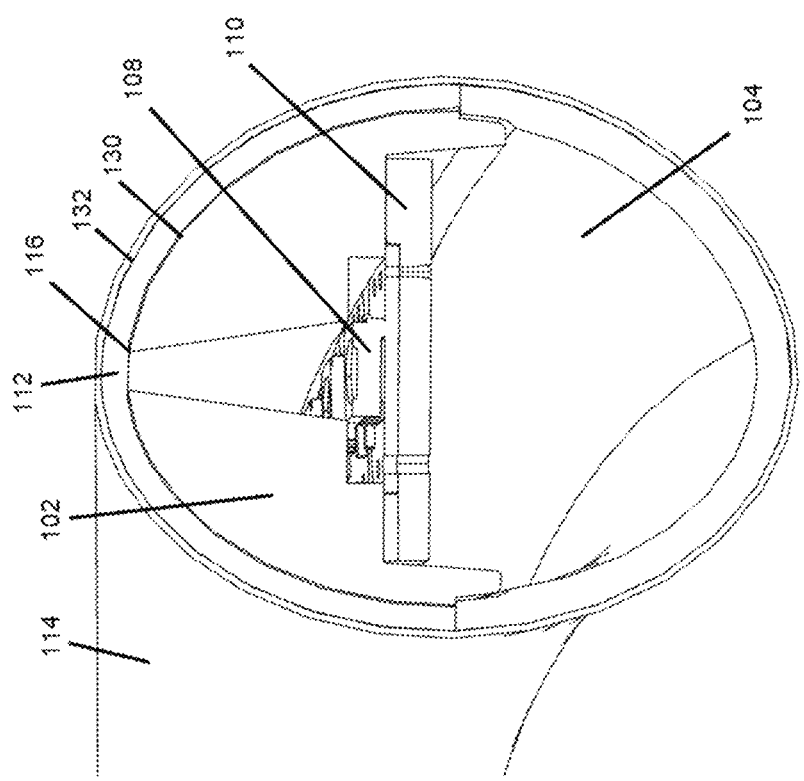
FIG. 11 is a cross section view of the illumination system and steering wheel rim of FIG. 9 along section lines A-A.
Figure 12:
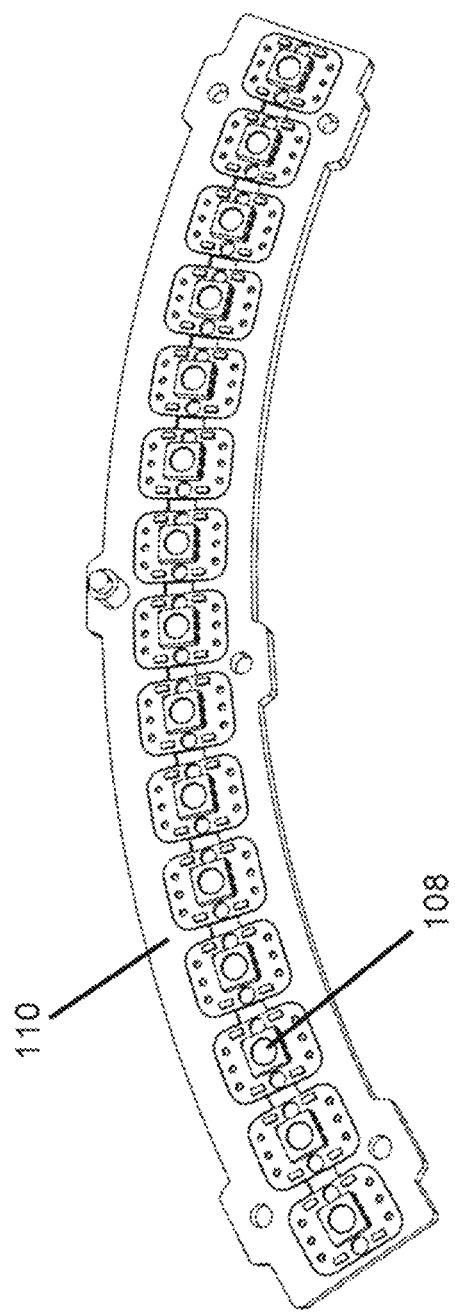
FIG. 12 is a perspective view of the PCB and light source of FIGS. 8-11.

In other implementations, a light guide is not used. Instead, light is emitted from the light source directly towards the front surface (passenger facing surface) of the steering wheel assembly. As a result, the light visible to the occupant is brighter because it does not pass through a light guide before being directed toward the occupant. Additionally, this allows for a segmented and/or several individually operated light sources providing more customized display options, e.g., stationary or moving text, light effect, pattern, logo, graphic or other unique light display. FIGS. 8 and 9 provide top and front partial cross section views of an exemplary illumination system 100. The illumination system 100 includes a housing 100 coupled to the rim 104/armature of the steering wheel. FIG. 10 provides a partial top cross section view similar to FIG. 8, taken at a location closer to the perimeter of the steering wheel rim, closer to the 12 o'clock position, compared to the cross section view of FIG. 8. FIG. 11 is a cross section view of the illumination system 100 and steering wheel rim of FIGS. 8-10 along section lines A-A. As illustrated in FIG. 11, the light source 108 is coupled to a PCB 110 for directing its operation. FIG. 12 illustrates a perspective view of the PCB 110 and light sources 108 of FIG. 8-11. The light sources 108 are positioned along the length of the PCB 110. As provided in FIG. 12, the light sources 108 are arranged in an arcuate pattern corresponding to the arcuate shape of the PCB 110. The light source 108 (e.g., a top-firing LED) is positioned adjacent the housing 102 such that light emitted from the light source 108 is directed through the housing 102 and opening 116 toward the front surface (e.g., passenger facing surface) of the steering wheel assembly. The light is directed from the light source 108 through a light channel 118 towards opening 116. The light then passes through the lens 112 (from the inner surface 130 of the lens 112 to the outer surface 132 of the lens 112) and cover material 114 towards the vehicle occupant.

As provided in FIG. 11, the light channel 118 has a decreasing tapered shape between the light source 108 and the opening 116. In other examples, the light channel 118 can have an increasing tapered shape, a straight shape, or any other regular or irregular shape for directing light from the light source 108 to the opening 116. As provided in FIG. 11, the opposing sides/walls of the light channel 118 are symmetrically shaped and similarly angled between the light source 108 and the opening 116. In further examples, however, the opposing walls/sides of the light channel 118 can be differently shaped or angled between the light source 108 and the opening 116. As illustrated in FIG. 5, it is contemplated that the illumination system 100 of FIGS. 1-4 can have a similar cross section to the illumination system cross section as illustrated in FIG. 11, e.g., including opening 116 and channel 118.

In any of the illumination systems 100 described above, the housing 102 is used to secure the illumination system components to the steering wheel rim 104. The housing 102 can include a single housing component extending around all or a portion of the circumference of the steering wheel rim 104. Example steering wheel assemblies, including a light guide and associated housing, covering films, and lenses, are described in U.S. Pat. No. 9,233,638, and U.S. Patent Publication Nos. 2018/0208111 and 2016/0311366, which are herein incorporated by reference in their entireties.

In another example, the illumination system 100 can include a second housing coupled to the first housing 102. The second housing can include the corresponding light source 108, light guide 106 (when used), etc. The second housing positioned around the circumference of the rim 104 from the housing 102. In another example, the illumination system 100 includes a plurality of housings coupled to the rim 104 (e.g., around the circumference of the rim 104 and along the front surface). Each of the plurality of housings 102 may include a corresponding light guide 106, light source 108, PCB 110, etc. Where a plurality of housings 102 are included, opposing ends of each of the plurality of housings 102 can be coupled to adjacent housings 102 such that the plurality of housings 102 form a continuous member around the circumference (or portion thereof) of the rim. It is contemplated that several housings 102 can be provided and coupled together such that the plurality of housings 102 fully encircle/traverse the circumference of the rim 104. The opposing ends of the plurality of housings 102 can be coupled and/or bonded together using any suitable mechanical and/or chemical fastener. The bonded ends of the housings 102 can be sanded or otherwise smoothed after being coupled/bonded together. The smoothing of the coupling point prevents the appearance of a seam (e.g., a seam between adjacent housings at the coupling point) from being visible through the cover material 114.

A lens 112 is provided covering the light guide 106 and/or opening 116 in the housing 102. In the example illumination system of FIGS. 1-5, and as illustrated in FIG. 5, the inner surface 130 of the lens 112 is disposed facing an outer surface of the light guide 106 such that an inner surface 130 of the lens 112 is oriented towards the light guide 106 and the outer surface 132 of the lens 112 is oriented away from the light guide 106 for directing light towards the front surface (passenger facing surface) of the steering wheel assembly. For example, the outer surface 132 of the lens 112 is oriented towards the passenger compartment of the vehicle such that light emitted from the light guide 106 and through the lens 112 is visible to vehicle occupants. In the example illumination system of FIGS. 8-11, and as illustrated in FIG. 11, the lens 112 is provided over the opening 116 in the housing 102 such that the inner surface 130 of the lens 112 is adjacent the opening 116 and the outer surface 128 of the lens 112 is orientated away from the light source 108/opening 116 for directing light towards the front surface (passenger facing) of the steering wheel assembly. As such, light emitted from the light source 108 and through the lens 112 is visible to the occupants.

In either embodiment, the lens 112 can be constructed from translucent material. In another example, at least a portion of the lens 112 can be opaque and/or transparent such that this portion of the lens 112 fully and/or partially blocks, masks, and/or shapes the boundary of the light emanating from the light source 108. The opaque and/or transparent portion can be formed using a masking layer (e.g., paint, IML) applied to the lens 112. Likewise, the masking/shaping of the light emanating from the light source 108 can be accomplished by use of a secondary component or material applied to the lens 112 or otherwise positioned between the light source 108 and the cover material 114. It is contemplated that one or more light directing films can be disposed in the path of the light emitted from the light source 108. For example, a light directing film can be provided between the light source 108 and the lens 112, e.g., adjacent the light source 108, adjacent the inner and/or outer surface 130, 132 of the lens 112. In the illumination system 100 of FIGS. 1-5, a light directing film can additionally and/or alternatively be provided adjacent the light guide 106 (e.g., at the outer surface of the light guide 106). One or more light diffusing films and/or light enhancing films can also be disposed in the path of the light emitted from the light source 108. For example, a light diffusing and/or enhancing film can be provided between the light source 108 and the lens 112, e.g., adjacent the light source 108, adjacent the inner and/or outer surface 130, 132 of the lens 112. In the illumination system 100 of FIGS. 1-5, a light diffusing and/or enhancing film can additionally and/or alternatively be provided adjacent the light guide 106 (e.g., at the outer surface of the light guide 106). An example light guide system including various light lenses, diffusing films, and/or enhancing films is described in U.S. Patent Publication No. 2016/0025281, which is herein incorporated by referenced in its entirety.

In either embodiment, a cover material 114 is provided covering the outer surface 130, 132 of the lens 112 and at least a portion of the outer surface of the steering wheel rim 104. Example steering wheel assemblies including a lighted surface on the rim that is covered with a cover material are described in U.S. Pat. Nos. 7,934,439 and 8,136,425, which are herein incorporated by referenced in their entireties. As described above, the cover material 114 is used to prevent components of the illumination system 100 from being visible by the occupant from the exterior of the illumination system 100. For example, the cover material 114 prevents the light guide 106, the light source 108, and the lens 112 from being visible when the light source 108 is not illuminated. Similarly, the cover material 114 also prevents a seam between the edge of the lens 112 and the rim 104 from being visible at any time. As such, the steering wheel appears to the occupant as a non-lit rim, with no visible indication of the internal illumination system components and no visible indication that the steering wheel assembly is different than any standard steering wheel assembly without an illumination system. However, as described in more detail below, when the light source 106 is illuminated, the emitted light passes through the cover material 114 and is visible to the occupant while the remaining internal illumination system components remain concealed.

The cover material 114 can include translucent and/or transparent portions that allow light emitted from the light source 108 to pass through the cover material 114 while preventing visibility of the internal illumination system components. When the light source 108 is illuminated, light is transmitted through the housing and towards the lens 112, passing through the lens 112 to the cover material 114. When a light guide 106 is used, as in FIGS. 1-5, the light source 108 is illuminated and the light guide 106 transmits the light from the light source 108 and through (at least a portion of) the outer surface of the light guide 106.

The light then passes through the transparent and/or translucent portions of the cover material 114 and exits the steering wheel assembly. The cover material 114 can also include opaque portions that block light emitted from the light source 108 from passing through the cover material 114. For example, the opaque and transparent/translucent portions can be used to form graphics, logos, or other unique patterns visible when the light source 106 is illuminated. The cover material 114 can be composed of at least one of a translucent natural leather material, a translucent artificial leather material, and/or a translucent fabric material. In some examples, the cover material 112 is composed of thin leather.

The cover material 114 can be used to diffuse or direct the light emitted from the light source 108. For example, the cover material 114 can prevent the occupant from experiencing hot spots (undesirable areas of increased light intensity) or glare from the emitted light. Additionally, the cover material 114 can include a texture or surface treatment on the inner or outer surface of the cover material 114. The texture or surface treatment alters the light passing through the cover material 114. For example, the texture or surface treatment can be used to diffuse or direct the emitted light and prevent the occupant from experiencing glare or hot spots.

Figure 6:
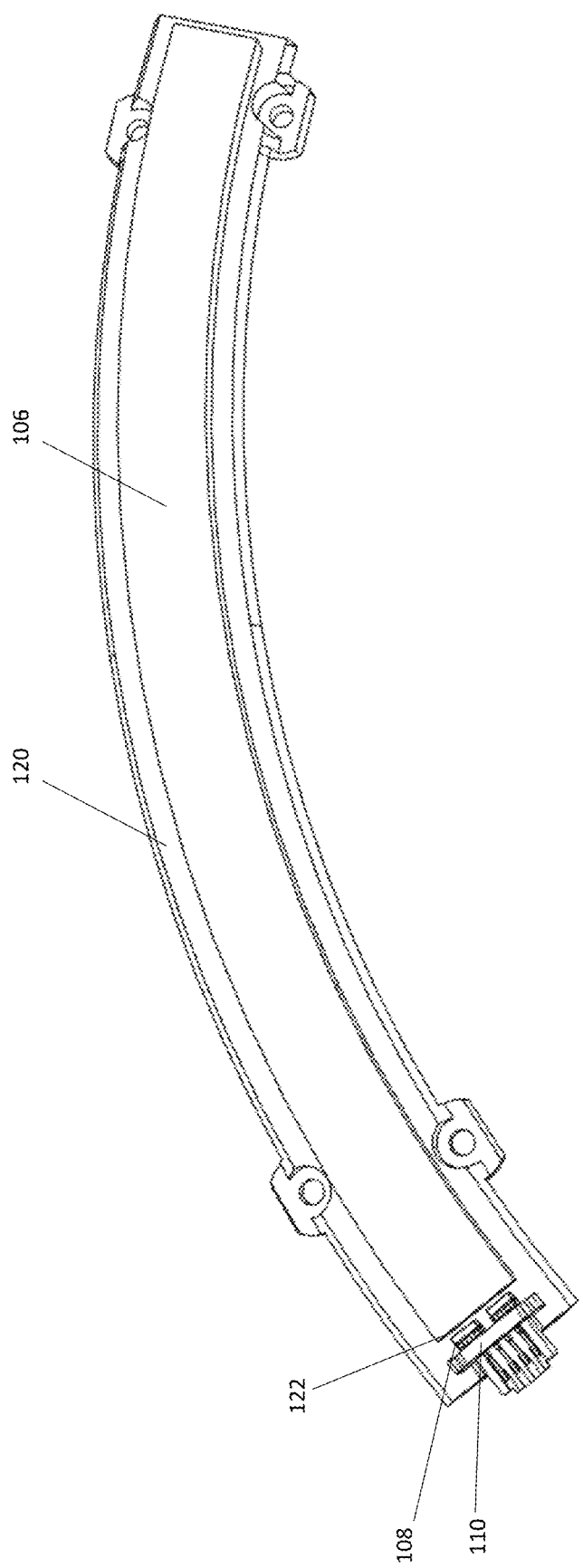
FIG. 6 is a perspective view of the light bar of FIGS. 1-2.
Figure 7:
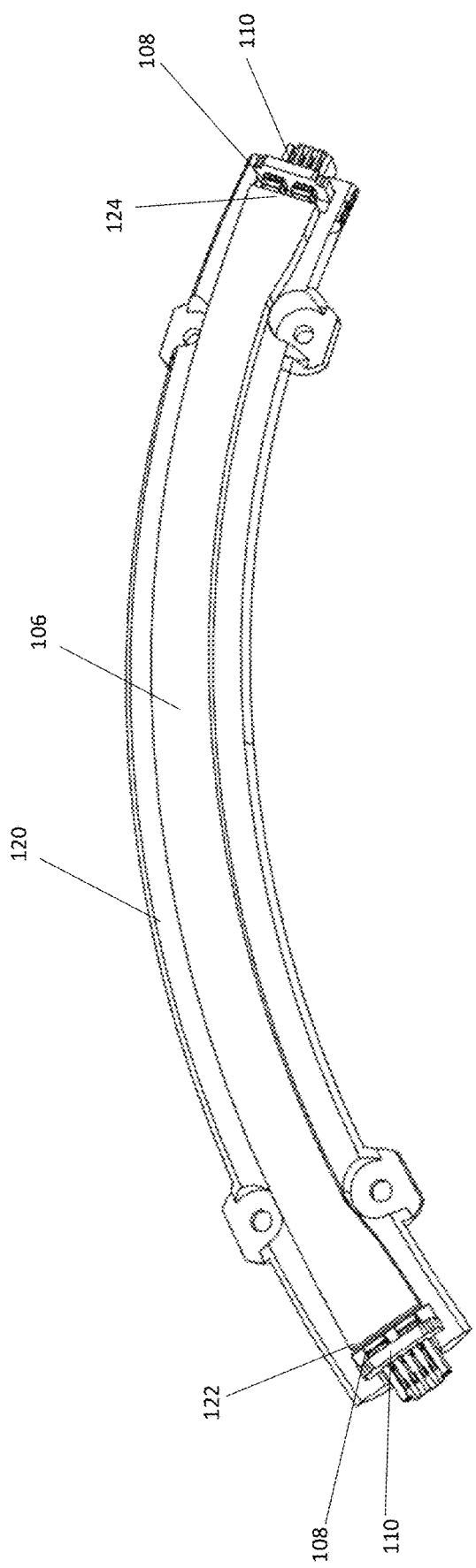
FIG. 7 is a perspective view of the light bar of FIGS. 3-4.

As illustrated in FIGS. 1, 3, and 6-7 the light source 108 can be disposed adjacent at least one end of the light guide 106. In this example, light emitted from the light source 108 is projected into the side/end of the light guide 106 and then directed (via the light guide 106) towards the outer surface of the light guide 106 and the lens 112. FIG. 6 illustrates a perspective view of the light guide 106 of FIG. 1. As provided in FIGS. 1 and 6, the light source 108 is positioned adjacent a first end 122 of the light guide 106. FIG. 7 illustrates a perspective view of the light guide 106 of FIG. 3. As provided in FIG. 7, the light source 108 is positioned adjacent both the first and second ends 122, 124 of the light guide 106.

As illustrated in the illumination system 100 of FIG. 8, the light source 108 is positioned to fire (e.g., illuminate) towards the front surface (passenger facing surface) of the steering wheel assembly. In addition, illumination system 100 allows for the use of multiple housing 102 segments, light sources 108 and/or light guides 106 positioned around the steering wheel rim 104. As illustrated in FIGS. 8-12, the example illumination system 100 can include multiple light sources 108 positioned along the rim 104 of the steering wheel assembly. Each of the light sources 108 can be coupled to corresponding PCBs 110 for controlling their operation. Alternatively, the light sources 108 can be coupled to a single PCB 110 for controlling their operation. Regardless of whether a single PBC 110 is used or multiple, it is contemplated that the operation of each of the individual light sources can be separately controlled. Individual control of the light source 108 improves the occupant's visual experience by controlling the brightness and clarity of the emitted light. It also allows for customized display options including stationary or moving text, light effect, pattern, logo, graphic or other unique light display. Example controlled light sources 108 for communicating with vehicle occupants are described in U.S. Pat. Nos. 8,296,012, 9,308, 856, 9,308,857, 9,520,061, 9,580,012, and U.S. Patent Publication Nos. 2016/0200246, 2016/0200343, which are herein incorporated by reference.

Figure 14:
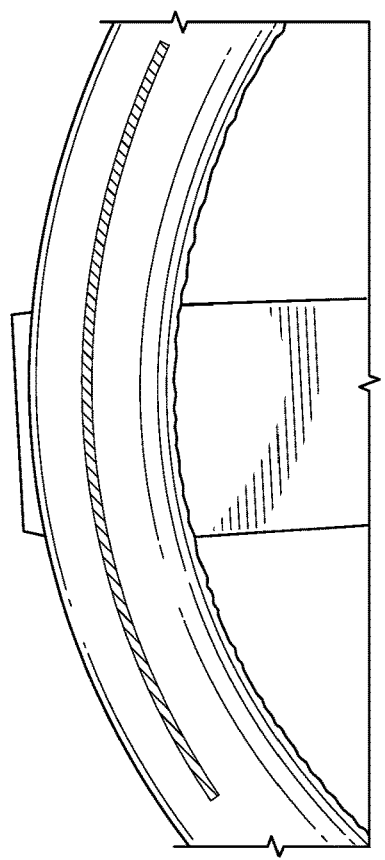
FIGS. 13-15 are partial front views of an example illumination system and steering wheel rim.
Figure 13:
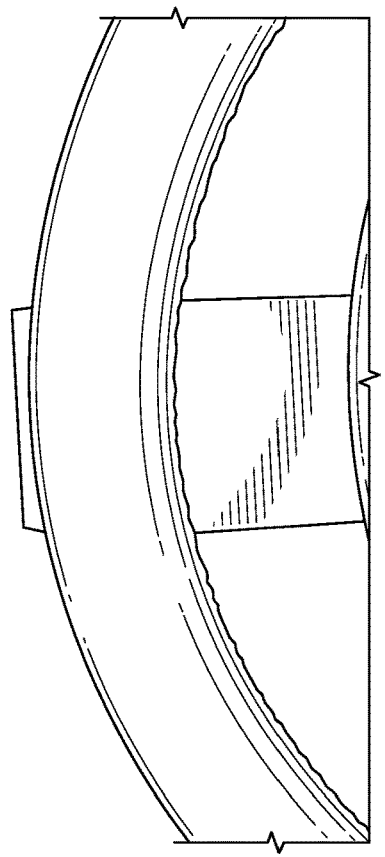
Figure 15:
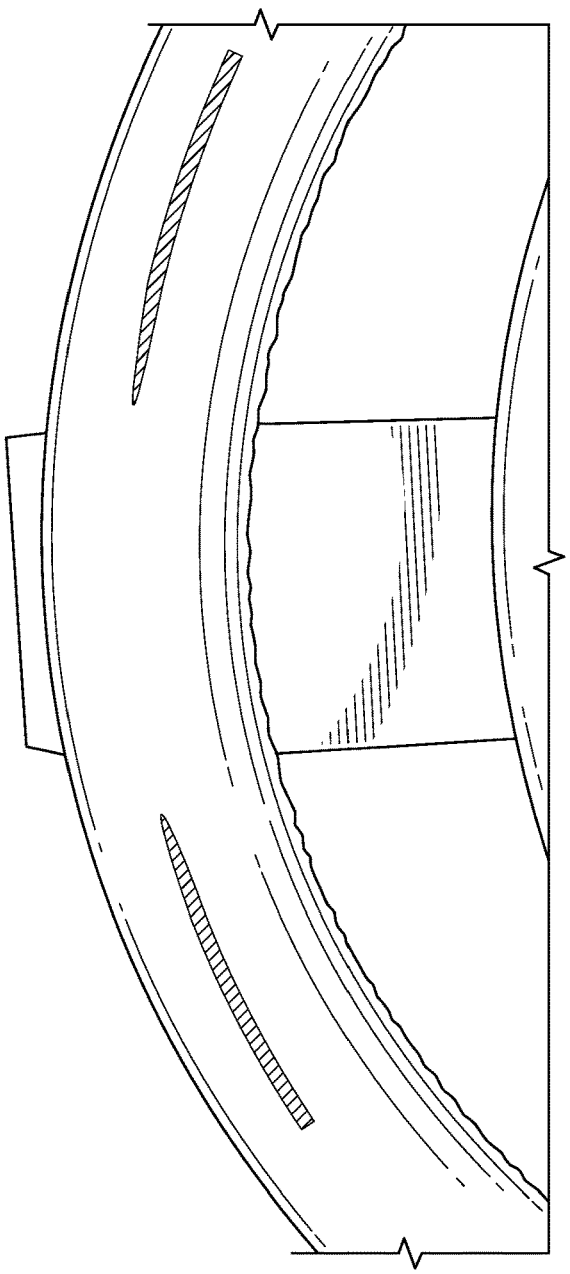

FIGS. 13-15 illustrate the exterior of the steering wheel assembly/rim 104 as visible to a vehicle occupant including various lighting designs that the light source 108 can cycle through. FIG. 13 illustrates the steering wheel assembly/rim 104 where the light source 108 is not illuminated. As described above, when the light source 108 is not illuminated the steering wheel appears to the occupant as a non-lit rim, with no visible indication of the internal illumination system components and no visible indication that the steering wheel assembly is different than any standard steering wheel assembly without an illumination system. As described above, by using multiple, individually controlled light sources 108, preferably firing directly toward the occupant, as in FIGS. 8-12, various stationary and/or moving patterns of the emitted light can be achieved. FIGS. 14 and 15 provide example illumination patterns of the light source 108. FIG. 14 illustrates the steering wheel assembly/rim 104 with a red colored, bar-shaped pattern displayed on a portion of the rim 104. FIG. 15 illustrates two green colored, bar-shaped patterns including a gradual/gradient fade in brightness toward the center of the rim. While these two patterns and colors are illustrated, it is contemplated that various other colors, patterns, shapes, and/or animations can be displayed using illumination system described herein.

The invention claimed is:

1. An illumination system for a steering wheel assembly of a vehicle, the illumination system comprising:
   a housing coupled to a rim of the steering wheel assembly;
   a visible light source disposed adjacent the housing and emitting visible light through an opening in the housing;
   a lens covering the opening in the housing, an inner surface of the lens disposed adjacent the opening in the housing;
   a cover material covering an outer surface of the lens and at least a portion of the rim, the cover material including at least one of a translucent portion, a transparent portion, or combinations thereof, wherein the lens is not visible through the cover material;
   wherein visible light emitted from the visible light source passes through the transparent translucent portions of the cover material.

2. The illumination system of claim 1, wherein the cover material includes opaque portions.

3. The illumination system of claim 1, wherein the cover material includes at least one of a translucent leather material, a translucent artificial leather material, and a translucent fabric material.

4. The illumination system of claim 1, wherein the translucent portion and transparent portion of the cover material are not visible until the visible light source is illuminated.

5. The illumination system of claim 1, wherein the visible light source, the housing, and the lens are not visible through the cover material.

6. The illumination system of claim 1, where any seam between an edge of the lens and the rim of the steering wheel assembly is not visible through the cover material.

7. The illumination system of claim 1, further including:
   a light guide received within the housing, the visible light source disposed adjacent the light guide,
   wherein the visible light source is disposed adjacent at least one of a first end and a second end of the light guide, the visible light source emitting visible light through the light guide and out an outer surface of the light guide, wherein the inner surface of the lens is disposed facing the outer surface of the light guide such at least some of the light emitted from the outer surface of the light guide is directed toward the lens.

8. The illumination system of claim 7, wherein the light guide and the housing have a corresponding arcuate shape, the arcuate shape of the housing and light guide corresponding to an arcuate shaped portion of the rim.

9. The illumination system of claim 1, wherein the visible light source is thermally coupled to a frame of the steering assembly such that the frame transfers heat from the visible light source toward the frame.

10. The illumination system of claim 1, wherein the lens is translucent.

11. The illumination system of claim 1, wherein at least a portion of the lens is opaque.

12. The illumination system of claim 1, further comprising one or more light directing films disposed in a path of the light emitted from the visible light source.

13. The illumination system of claim 1, further comprising at least one of a light diffusing film a light enhancing film, or a combination thereof, disposed in a path of the light emitted from the visible light source.

14. The illumination system of claim 1, further comprising at least one masking layer coupled to the lens, the masking layer at least partially blocking and at least partially shaping a boundary of the light emitted from the visible light source.

15. The illumination system of claim 1, further including a second housing coupled to the housing, the second housing positioned around a circumference of the rim of the steering wheel assembly from the housing.

16. The illumination system of claim 1, further comprising:

a plurality of housings coupled to a front surface of the rim, wherein opposing ends of each of the plurality of housings are coupled an adjacent housing such that the plurality of housings fully encircle a circumference of the rim.

17. The illumination system of claim 16, wherein the opposing ends of the plurality of housings are bonded together using at least one of a mechanical and a chemical fastener.

18. The illumination system of claim 17, wherein the bonded opposing ends of the plurality of housings are sanded after being bonded together to prevent appearance of a seam being visible through the cover material.

19. The illumination system of claim 1, wherein the housing has an arcuate shape corresponding to an arcuate shaped portion of the rim.

20. The illumination system of claim 1, wherein the visible light source includes a plurality of individually controlled light sources positioned around at least a portion of a circumference of the rim of the steering wheel.

21. An illumination system for a steering wheel assembly of a vehicle, the illumination system comprising:

a housing coupled to a rim of the steering wheel assembly;

a light guide received within the housing;

a visible light source disposed adjacent an end surface of the light guide and emitting visible light through the light guide and out an outer surface of the light guide;

a lens provided over the light guide, an inner surface of the lens disposed facing the outer surface of the light guide, a cover material covering an outer surface of the lens and at least a portion of the rim, the cover material including at least one of a translucent portion, a transparent portion, or a combination thereof;

wherein the light guide transmits visible light from the visible light source through at least a portion of the outer surface of the light guide, and the light from the outer surface of the light guide passes through the lens and the transparent and translucent portions of the cover material, wherein the translucent and transparent portions of the cover material are not visible until the visible light source is illuminated.

* * * * *